Oct. 9, 1923.
V. C. KREUTZ
AUTOMATIC PERCOLATOR
Filed May 23, 1922
1,470,584
3 Sheets-Sheet 1
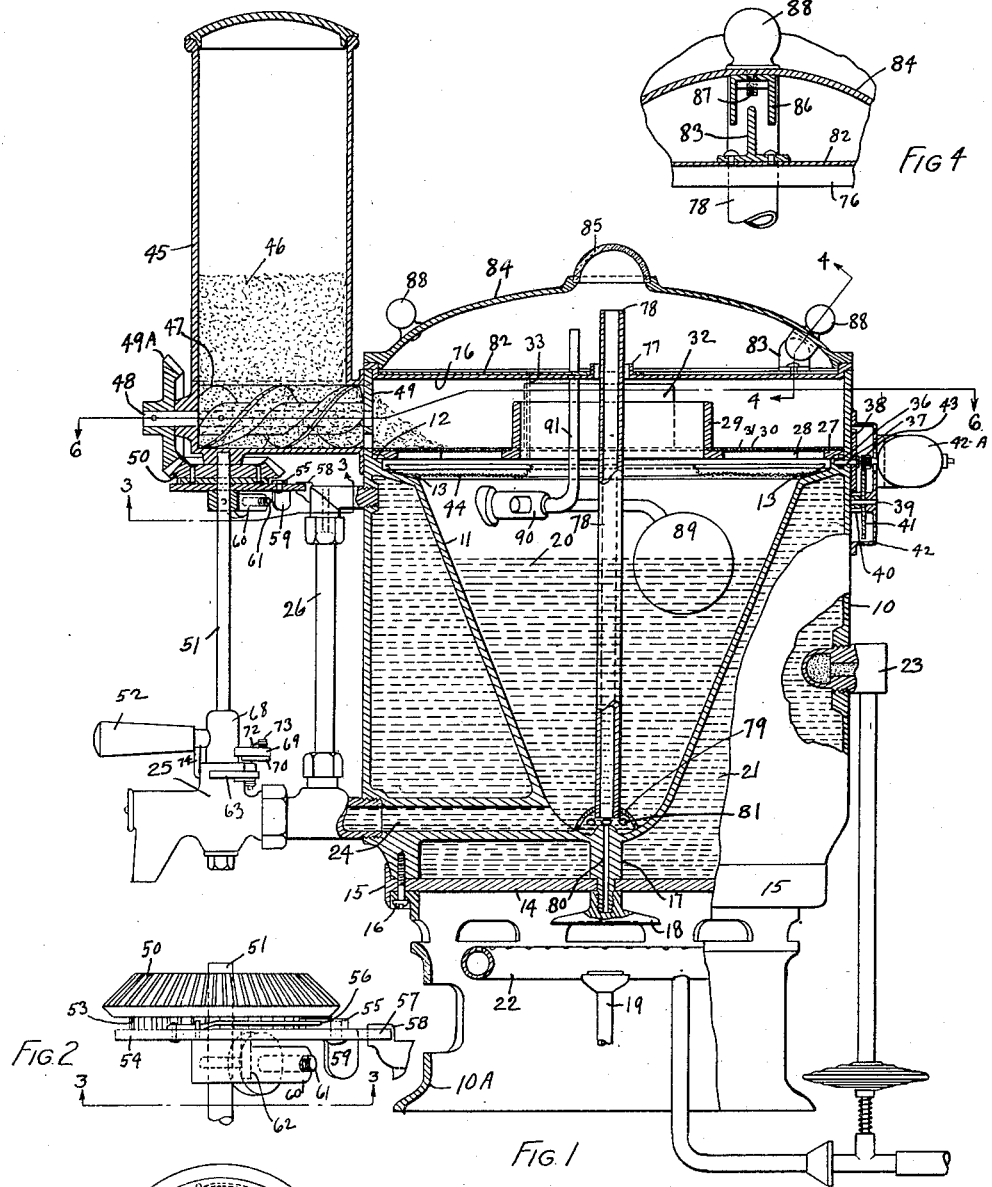
FIG. 4
FIG. 1
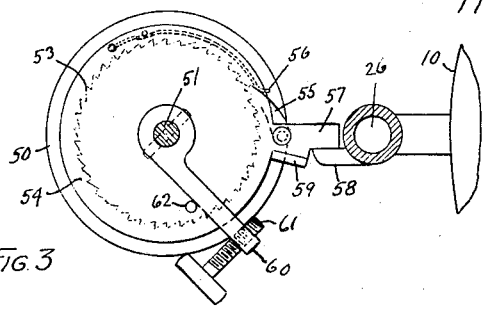
FIG. 2
FIG. 3
INVENTOR.
VERNON C. KREUTZ
BY E. B. Birkenbuel
ATTORNEYS.

Oct. 9, 1923.

V. C. KREUTZ 1,470,584

AUTOMATIC PERCOLATOR

Filed May 23, 1922    3 Sheets-Sheet 2

INVENTOR
VERNON C. KREUTZ
By E.B.Birkenbeul
HIS ATTORNEY.

Oct. 9, 1923.
V. C. KREUTZ
1,470,584
AUTOMATIC PERCOLATOR
Filed May 23, 1922
3 Sheets-Sheet 3
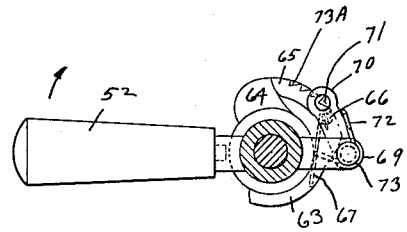
FIG 8
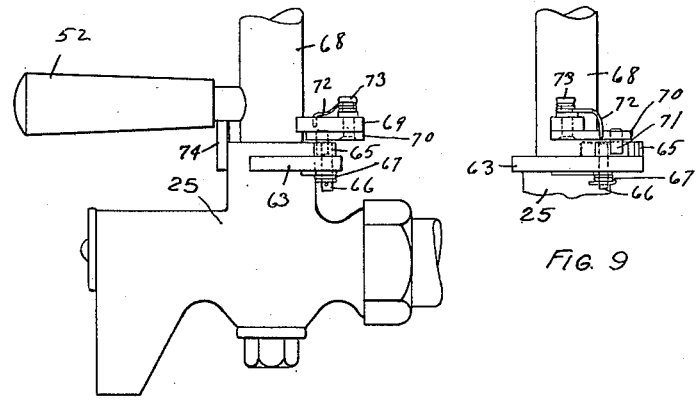
FIG. 7
FIG. 9
INVENTOR
VERNON C. KREUTZ
By E.R. Burkenbuel
HIS ATTORNEY Patented Oct. 9, 1923.

1,470,584

UNITED STATES PATENT OFFICE.

VERNON C. KREUTZ, OF PORTLAND, OREGON, ASSIGNOR OF ONE-HALF TO EDWIN B. WHEAT, OF PORTLAND, OREGON.

AUTOMATIC PERCOLATOR.

Application filed May 23, 1922. Serial No. 563,093.

*To all whom it may concern:*

Be it hereby known that I, VERNON C. KREUTZ, a citizen of the United States, and a resident of Portland, in the county of Multnomah and State of Oregon, have invented a new and useful Automatic Percolator, of which the following is a specification.

This invention relates more particularly to coffee percolators.

The objects of my invention are to provide an exceedingly simple and efficient percolator which will automatically make a new cup of coffee when one is drawn off and at the same time discharge a portion of the oldest grounds in the percolator in a manner that a definite limit can be placed upon the time when coffee grounds may remain exposed to the action of water.

A further object is to provide an accurate adjustment for the relation between the water and ground coffee injected into the percolator when any coffee is withdrawn.

Another object is to so construct my device that anyone drawing coffee from same will be forced to operate the coffee valve its full distance in order to insure the proper functioning of the feed mechanism for the ground coffee.

Another object is the elimination of muddy coffee by straining the liquid which falls from the ground coffee compartment.

Another object is to so construct my device that water may be prevented from passing over the grounds if desired.

Still another object is to regulate the temperature of the water which is used in making new coffee.

Figure 5:
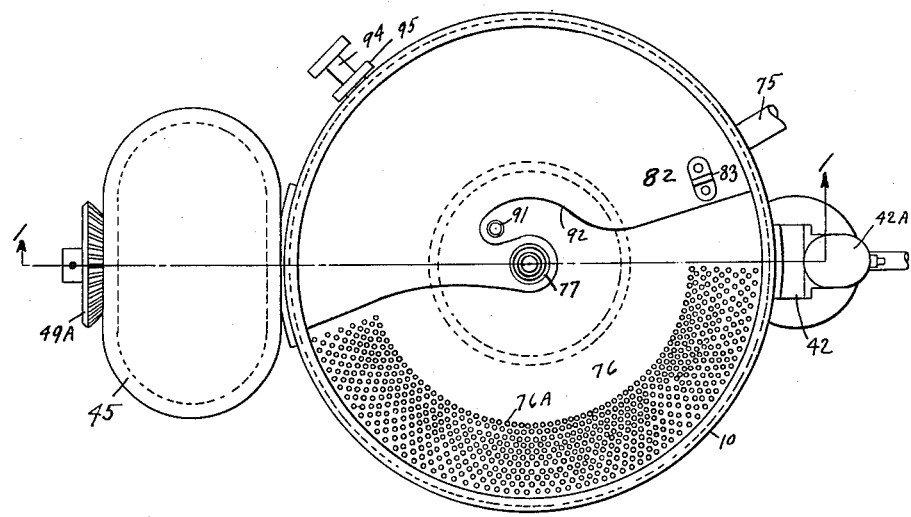
Figure 6:
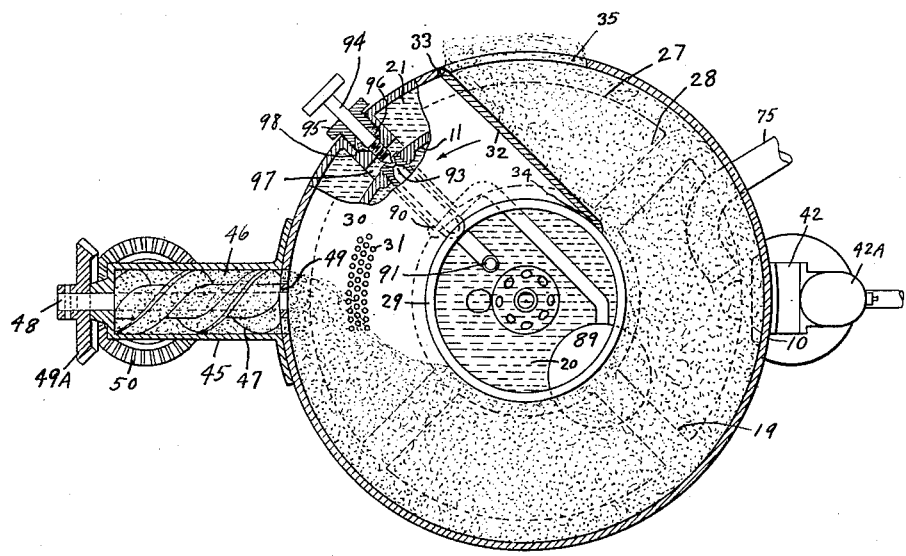

These and other objects are accomplished in the manner set forth in the following specification and illustrated in the accompanying drawings, in which:

Figure 1 is a vertical section along the line 1—1 in Fig. 5. Figure 2 is an enlarged elevation of the ground coffee feed regulating device. Figure 3 is a section looking upward along the line 3—3 in Fig. 2. Figure 4 is a section along the line 4—4 in Fig. 1. Figure 5 is a plan of the device with the cover removed. Figure 6 is a section along the line 6—6 in Fig. 1. Figure 7 is an enlarged view of the coffee valve showing the full stroke mechanism. Figure 8 is a plan of Fig. 7. Figure 9 is a side elevation of Fig. 7.

Similar numbers of reference refer to the same or similar parts throughout the several views.

Referring in detail to the drawings, I have constructed my device of a cylindrical urn member having outer walls 10 and a cone-shaped inner wall 11 joining the wall 10 below its upper edge and forming at the point of union a flat ledge 12 and the sloping ledge 13. A bottom 14 provided with a flat rim 15 is secured to the under side of the member 10 by means of the screws 16. A hollow base 17 formed on the under side of the member 11 shoulders in the bottom 14 and has threaded on its projecting end a circular plate 18 against which a percolating flame is directed by the burner 19. The coffee 20 which is ready for drinking purposes is stored in the vessel formed by the walls 11. The space between the walls 10 and 11 and the bottom 14 contains hot water 21 which is heated by the large burner 22 whose flame is regulated by the thermostat 23.

It is understood that any convenient type of thermostat for regulating the temperature of the water 21 may be employed without departing from the spirit of my invention.

A channel 24 is formed between the walls 10 and 11 and is supplied at its upper end with a coffee valve 25, which valve has the usual indicator glass 26 which shows the amount of coffee 20 within the urn. Resting on the ledge 12 is a revolving gear 27 whose spokes 28 terminate in the cylindrical hub 29 which rises above the spokes 28. A thin metal disk 30 is secured on the upper side of the gear 27 around the hub 29 and is perforated all over with the holes 31. A gate 32 hinged at the pivot 33 in the wall 10 scrapes the upper surface of the disk 30, and since the end 34 rides against the hub 29 it is evident that any grounds resting on the disk 30 will be ejected from the opening 35 in the wall 10. The teeth of the gear 27 are on its under side and mesh with the pinion 36 which is secured on the same shaft 37 as is the gear 38.

On a counter shaft 39 is mounted the pinion 40 which meshes with the gear 38 and is driven by the gear 41 also on the counter shaft 39. A housing 42 covers the gears 38 and 41 and carries a motor 42ᴬ whose pinion 43 drives the gear 41. It will be understood that the purpose of this gearing is merely speed reduction since it is desired to rotate the plate 30 about one revolution in eight minutes.

Below the gear 27 and resting on the sloping ledge 13 is a very finely meshed screen 44 through which the new drink must pass after it has dripped from the grounds which ride upon the member 30. Attached to the top side of the wall 10 is a hopper 45 for ground coffee 46. In the bottom of the hopper 45 is a screw conveyor 47 whose shaft 48 journals in the bracket 49 and in the hopper 45. A bevel gear 49<sup>A</sup> is secured on the shaft 48. A bevel gear 50 is loosely mounted on the shaft 51 which is actuated by the hand lever 52 of the coffee valve 25.

A ratchet wheel 53 is mounted on the shaft 51 against the gear 50 and is secured to same by any convenient means. Below the ratchet wheel 53 and loosely mounted on the shaft 51 is a disk 54 whose pawl 55 is held into engagement with the teeth of the wheel 53 by the spring 56.

A radially projecting lug 57 on the disk 54 engages a stop 58 which is formed on the upper support for the indicator glass 46 and limits the rotation of the disk 54 in one direction. A downwardly projecting lug 59 is also formed on the disk 54. Secured to the shaft 51 is an arm 60 provided with an adjusting screw 61 adapted to engage the lug 59. A stud 62 projects from the under side of the disk 54 and acting against said stud the arm 60 returns the lug 57 to the stop 58 when the coffee valve hand lever 52 is moved to its closed position.

Projecting from the side of the coffee valve 25 is a flange 63 which extends part way around the valve 25. The portion 64 of the flange 63 is raised and acts as a stop for the curved ratchet 65 which is hinged to the flange 63 by means of the pin 66. A spring 67 on the pin 66 holds the member 65 against the stop 64. On the side of the stem 68 of the valve 25 I have formed a projecting arm 69 which carries a hinged pawl 70 whose point 71 is on its under side and is adapted to pass entirely around the ratchet 65. The spring 72 on the pin 73 holds the pawl point 71 toward the stem 68. This mechanism operates to insure a complete throw of the lever 52.

The operation of this mechanism will be understood from Figures 7, 8 and 9. In Figure 8, which is a plan, the arrow indicates the direction in which the lever 52 is moved to open the valve 25. Even a slight movement of the lever 52 will cause the point 71 to engage the first notch 73<sup>A</sup> and prevent the return of the lever 52 to its closed position until the point 71 has passed over all of the ratchet teeth and dropped off of the end of the ratchet 65, behind which it can now pass and again occupy its former position of rest by passing between the stop 64 and the ratchet 65. On the under side of the lever 52 I have placed an arm 74 which engages the ends of the flange 63 and limits the rotation of the lever 52.

Water is admitted into the device from city pressure and passes through the inlet 75 conveniently placed in the wall 10, preferably at a point where the incoming water will strike the thermostat 23 and thereby obtain quicker action from the heating element.

Resting on the upper edge of the wall 10 is a water distributing tray 76 which is perforated with the holes 76<sup>A</sup> over a small portion of its area, as shown in Figure 5. The tray 76 has a central opening around which is placed a cylindrical wall 77 somewhat higher than the level of the tray itself. The percolator stem 78 passes upwardly through this opening and its lower end is provided with the usual dome-shaped base 79 which rests on the bottom of the coffee containing compartment. This stem is hollow and when in position it is directly above the hole 80 in the member 17. The member 79 is preferably provided with a number of holes 81.

Resting on the tray 76 is a water distributing disk 82 which pivots on the cylindrical wall 77. This plate is provided with an upstanding arm 83 which is secured on its upper side. A dome-shaped cover 84 is provided with the usual glass center piece 85, which is of such shape as to best distribute the water rising from the percolating stem 78.

If for any reason the coffee should become too strong and it is desired to prevent the further passing of water over the grounds on the member 30 it is only necessary to rotate the plate 82 and cover some of the holes 76<sup>A</sup> in the tray 76. In order to render this action less difficult I have provided a fork-shaped arm 86 on the under side of the cover 84. This forked arm is attached to the cover 84 by means of a bolt 87 which forms a part of the knob 88. A similar knob 88 is provided on the other side of the cover 84 to assist in the turning of the cover. It will be seen that this renders it possible to turn the member 82 without raising the cover 84 at all. The wall 77 is raised for the purpose of causing water to pass through all of the holes 76<sup>A</sup> which are not covered by the member 82. If it is not possible for all of the water to pass through these holes it overflows around the stem 78 and passes down into the coffee 20.

In order to regulate the amount of liquid which may occupy the coffee containing compartment at one time I have provided a float 89 which actuates a valve 90, one end of which opens into a vertical tube 91 which passes upwardly through the tray 76 and through a slot 92 in the member 82. The opposite end 93 of the valve 90 is controlled by a needle valve 94 operated from the outside of the wall 10. The usual packing gland 95 and packing 96 are employed with this valve. A port 97 is cut through the stuffing box 98 to permit the water 21 to pass through the valve 90 and the pipe 91 and fall upon the coffee which has just been discharged upon the member 30 by the conveyor 47 causing same to scatter over the member 30, as indicated in Figure 6, until discharged from the opening 35.

The operation of my device is as follows: When an attendant draws a cup of coffee from the valve 25 by operating the lever 52 he does two things besides drawing the coffee. The first is to actuate the conveyor 47 which places a corresponding amount of fresh ground coffee upon the member 30. It also causes the level of the coffee 20 to fall, which automatically, through the float 89, permits hot water 21 to fall on the newly inserted ground coffee.

It will be borne in mind that the motor 42^A causes the tray 30 to rotate continuously, which will prevent any grounds from remaining on the tray for an undesirable length of time. It will also be observed that the escape of water 21 from its compartment will also permit cold water to enter the inlet pipe 75 and that this cold water is directed against the sensitive portion of the thermostat 23 which causes the flame from the burner 22 to rise higher than is actually necessary for the heating of this small amount of water, and naturally as this cold water begins to take the temperature of the large volume of water in the jacket in which it is confined, the flame is cut down.

Attention is drawn to my application No. 491,475, filed August 11, 1921, for a similar device over which the percolator described in this application is an improvement.

I am aware that many different mechanisms may be employed to accomplish the objects heretofore mentioned, I therefore do not wish to limit myself to this precise form of construction but intend that it shall embody all forms and modifications that fall fairly within the appended claims.

What I claim as new is:

1. In a percolator, the combination of a coffee containing vessel, a float means for maintaining a constant level of liquid in said vessel, a valve for drawing coffee from said vessel, a revolving tray over said coffee container adapted to hold ground coffee, and means for continuously rotating said tray.

2. In a percolator, the combination of a coffee containing vessel, a float means for maintaining a constant level of liquid in said vessel, a valve for drawing coffee from said vessel, a revolving tray over said coffee container adapted to hold ground coffee, a means for continuously rotating said tray, and means for passing water downwardly through ground coffee on said tray and into said vessel.

3. In a percolator, the combination of a coffee containing vessel, a float means for maintaining a constant level of liquid in said vessel, a valve for drawing coffee from said vessel, a revolving tray over said coffee container adapted to hold ground coffee, a means for continuously rotating said tray, means for passing water downwardly through ground coffee on said tray and into said vessel, a hopper for storing unused ground coffee, and a conveyor for moving said ground coffee from the hopper to said tray.

4. In a percolator, the combination of a coffee containing vessel, a float means for maintaining a constant level of liquid in said vessel, a valve for drawing coffee from said vessel, a revolving tray over said coffee container adapted to hold ground coffee, a means for continuously rotating said tray, means for passing water downwardly through ground coffee on said tray and into said vessel, a hopper for storing unused ground coffee, a conveyor for moving said ground coffee from the hopper to said tray, a means for actuating said conveyor from said coffee valve, and means for regulating the amount of coffee moved by said conveyor.

5. In a percolator, the combination of a coffee containing vessel, a water jacket around said vessel, a float means for maintaining a constant level of liquid in said vessel, a valve actuated by said float adapted to admit water from said jacket to said vessel, a revolving tray over said coffee container adapted to hold ground coffee, means for continuously rotating said tray, and means for removing the used coffee grounds from the tray.

6. In a percolator, the combination of a coffee containing vessel, a water jacket around said vessel, means for heating the water in said jacket, a float means for maintaining a constant level of liquid in said vessel, a valve for admitting water from the water jacket to the vessel, a revolving tray over said coffee container and adapted to hold ground coffee, means for continuously rotating said tray, means for removing used ground coffee from the tray, a hopper for storing unused ground coffee, and a conveyor for moving said ground coffee from the hopper to the tray.

7. In a percolator, the combination of a coffee containing vessel, a valve for drawing coffee from said vessel, a full stroke mechanism on said valve, a revolving tray over said coffee container, a hopper for storing unused coffee, a conveyor for moving said ground coffee from the hopper to the tray, means for actuating said conveyor from said coffee valve, and means for adjusting the amount of coffee placed upon said tray by said conveyor.

8. In a percolator, the combination of a coffee containing vessel, a revolving tray over said coffee container, a water distributing plate above said tray, means for regulating the amount of water passing over the ground coffee on said tray, and means for actuating said water regulating means.

9. In a percolator, the combination of a coffee containing vessel, a revolving tray over said vessel, a water distributing plate above said tray, means for passing water downwardly through said distributor upon the ground coffee on said tray, a filtration screen under said tray, and means for regulating the amount of water passing through said tray.

10. In a percolator, the combination of a coffee containing vessel, a perforated revolving tray over said coffee container adapted to hold ground coffee while being percolated, means for continuously rotating said tray and discharge the oldest grounds therefrom, a hopper for storing unused ground coffee, a conveyor for moving said ground coffee from the hopper to the tray, means for actuating said conveyor from said coffee valve, means for regulating the amount of coffee moved by said conveyor, a water jacket around said coffee containing vessel, means for heating the water in said jacket, and a temperature controlling means consisting of a thermostat adapted to regulate the amount of heat applied to said water jacket.

VERNON C. KREUTZ.